No. 874,925. PATENTED DEC. 31, 1907.
F. BARTZ & F. A. WYGANT.
COFFEE MILL.
APPLICATION FILED JUNE 17, 1907.

Witnesses
R. J. Beall.
J. W. Duvall.

Inventors
Frank Bartz
Frederick A. Wygant
By John D. Thomas & Co.
Attorneys

UNITED STATES PATENT OFFICE.

FRANK BARTZ AND FREDERICK A. WYGANT, OF HORNELL, NEW YORK, ASSIGNORS TO BARTZ, WYGANT & BROWN, OF HORNELL, NEW YORK, A CORPORATION.

COFFEE-MILL.

No. 874,925.      Specification of Letters Patent.      Patented Dec. 31, 1907.

Application filed June 17, 1907. Serial No. 379,416.

*To all whom it may concern:*

Be it known that we, FRANK BARTZ and FREDERICK A. WYGANT, citizens of the United States, residing at Hornell, in the county of Steuben and State of New York, have invented certain Improvements in Coffee-Mills, of which the following is a specification.

This invention is an improvement in mills for grinding or pulverizing coffees and spices, and relates more especially to the grinding or pulverizing disks used in connection with such mills.

The primary object of the invention is to provide a set of grinding or pulverizing disks for coffee mills in which the faces of said disks between which the coffee beans are fed act to cut the coffee beans into minute particles so as to retain the fusel oil and also prevent heating of the coffee during the operation of pulverizing the same.

With this primary object in view the invention consists in the particular construction of the grinding or pulverizing disks, all as hereinafter described and specifically set forth in the appended claims.

Figure 1:
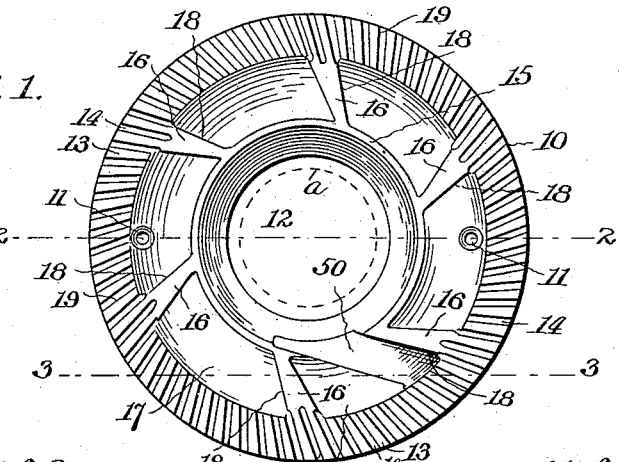
Figure 2:
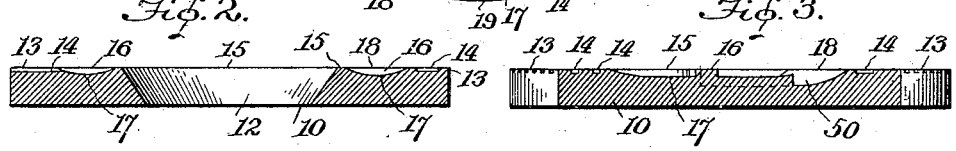
Figure 3:
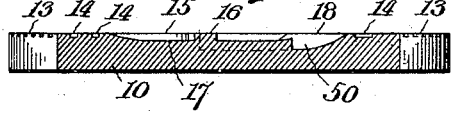
Figure 4:
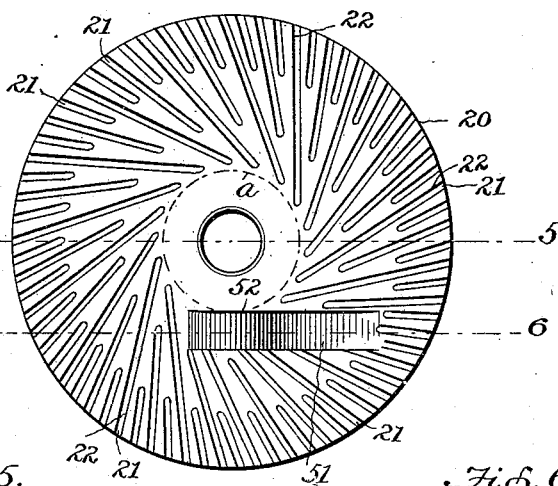
Figure 5:
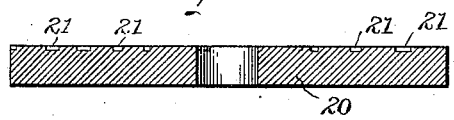
Figure 6:
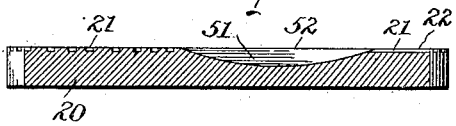

In the accompanying drawings, which form a part of this specification—Figure 1 is a plan or face view of the stationary grinding or pulverizing disk. Fig. 2 is a sectional view thereof, on the line 2—2. Fig. 3 is a sectional view on the line 3—3. Fig. 4 is a plan or face view of the rotatable grinding or pulverizing disk. Fig. 5 is a sectional view thereof on the line 5—5. Fig. 6 is a sectional view of the same on the line 6—6.

Like numerals of reference indicate like parts in the several views of the drawings.

Referring to said drawings, 10 designates one of the grinding or pulverizing disks, in the present instance the stationary disk, and is therefore provided with countersunk screw-holes 11, through which the attaching screws pass, said disk being also provided with the usual central opening 12, through which the coffee beans are fed to the grinding or pulverizing disks, this opening being beveled outward to the face of the disk. The disk 10 is provided at its outer edge with a marginal series of elongated cutting teeth 13, spaced apart by the intermediate shallow grooves or channels 14, said teeth and channels being disposed on tangential lines which touch a small circle indicated by the dotted lines $a$. The grooves or channels open out at the edge of the disk so that the coffee may pass beyond the disk after it is pulverized and be discharged from the mill. Surrounding the central opening 12 is a circular rib 15, the surface of which is flush with the outer face of the teeth 13, and extending between the circular rib 15 and the marginal series of teeth 13 are ribs 16, which are also disposed tangentially and substantially on a line with said teeth. The face of the disk is hollowed out between the ribs 15 and 16 and the series of teeth 13, so as to form pockets 17, the latter being concave in the direction of the diameter of the disk (see Fig. 2) and at opposite ends terminate in walls disposed at right angles to the plane of said disk, such walls being the opposite sides of the ribs 16. One of the side edges, as 18, of each rib 16 forms a cutting edge which co-acts with certain cutting edges of the rotatable grinding or pulverizing disk, hereinafter described, and likewise one of the edges, as 19, of each cutting tooth 13 forms a similar cutting edge.

20 designates the rotatable grinding or pulverizing disk the face of which is provided with grooves or channels 21 extending from the periphery of said disk and disposed tangentially, the tangency of said grooves or channels corresponding substantially with that of the grooves or channels 14 of the stationary disk 10 and therefore touch a circle, as $a$, of the same diameter as the circle $a$ in Fig. 1. The grooves or channels 21 are not all of the same length, and as shown there are a series of long channels which extend to near the center of the disk, and between said longer channels are located two short channels and a channel of intermediate length, as shown in Fig. 4 of the drawings. In each instance, as will be seen, the channel opens out at the periphery of the disk so that the pulverized coffee may be discharged from between the disks. The channels 21 are adapted to receive the particles of coffee and one edge, as 22, of each channel forms a cutting edge in conjunction with the cutting edges 18 and 19 of the other disk, it being understood, of course, that the disks are placed face to face and when so placed the cutting edges of one disk will be at a slight angle to the cutting edges of the other disk, so that a shearing cut will be produced and in that direction to advance the particles of coffee towards the outer edges of the disks.

In order to provide for feeding the coffee beans between the disks, so that they may be acted upon by the cutting edges of both disks, the stationary disk 10 is provided with a recess 50 which extends from a point slightly within the circular rib 15 to the inner end of several of the marginal teeth 13, said recess being deeper at its inner end and the bottom thereof is inclined upward at its outer end, as shown in Fig. 3. This recess 50 is at one side of one of the ribs 16, or at that side having the cutting edge 18, for the purpose hereinafter explained. The other or rotatable disk is provided with a recess 51, which is disposed parallel with the diameter of the disk and located so that its inner longitudinal edge 52 will be slightly within the inner edge of the circular rib 15 of the disk 10 when said disks are placed together, the longitudinal edge 52 forming a cutting edge which co-acts with the cutting edges 18.

In the operation of the grinding or comminuting disks it will be understood that the disk 10 is secured in the mill with the recess 50 lowermost so as to receive the coffee beans as they are fed through the opening 12, and that the disk 20 is attached to the driving shaft so as to be rotated thereby, said disks being arranged so that the faces thereof will be in slight contact and produce a shearing cut as the oppositely disposed cutting edges pass each other. Now when the rotatable disk 20 is turned and as the recess 51 therein reaches the recess 50 in the stationary disk a coffee bean will be taken into said recesses and upon further movement of the rotatable disk the inner longitudinal wall of the recess 51 will push the coffee bean towards the outer end of the recess 50, and the cutting edges 52 and 18 will then act to cut the bean into two parts, one of which is carried by the recess 51 and deposited into one of the pockets 17. As these pockets fill up the cutting edges 18 of the ribs 16 in conjunction with the cutting edges 22 of the channels 21 in the rotatable disk act to produce smaller particles and these are advanced outward by the channels 21 registering with the inner ends of the channels 14, and are again cut as the cutting edges 19 and 22 pass each other. It will be seen, therefore, that the size of the particles which are finally discharged from between the disks is determined by the depth of the channels 21 and 14, and that in the operation of the disks the particles are not mashed or squeezed between the disks but are cut smaller and smaller as the coffee passes from the center to the periphery of said disks. This operation not only results in each minute particle of coffee retaining its fusel oil, but it is also found that by the employment of disks of this particular construction a mill will comminute or pulverize coffee more quickly and with the expense of less motive power, and when the coffee is discharged from the mill it is not heated as is the case with ordinary pulverizers.

It will be understood that the tangency of the cutting edges 18, 19 and 22 will determine the speed at which the particles are advanced towards the periphery of the disks, and that therefore the greater the tangency the quicker the particles will be advanced, and in order that the particles may all be reduced to the minimum size and at the same time not lag between the disks the tangency shown in the drawings has been found best suited for pulverizing coffee to the customary degree of fineness.

Though the disks shown and described herein are especially adapted for pulverizing or comminuting coffee we do not wish to limit them to this use, as they may be employed also in pulverizing spices, etc.

Having thus described our invention, what we claim as new is:—

1. A grinding or pulverizing disk for mills, the face of which disk is provided with a marginal series of tangentially disposed teeth having cutting edges, a circular rib surrounding a central feed-opening in the disk and having its outer surface flush with the outer surface of the teeth, ribs extending tangentially from said circular rib to the marginal series of teeth, pockets formed between the ribs and teeth, and a recess extending across the circular rib to connect the feed opening with one of the pockets and feed the coffee beans thereto.

2. A grinding or pulverizing disk for mills, the face of which disk is provided with a marginal series of shallow channels tangentially disposed and forming teeth 13, a circular rib surrounding a central feed opening in the disk and having its outer surface flush with the outer surface of the teeth, ribs extending tangentially from the circular rib to the marginal series of teeth and each having a cutting edge, pockets between the ribs and teeth and inclined upward towards the teeth, and a recess for feeding the coffee beans to one of the pockets cutting across the circular rib and extending alongside the cutting edge of one of the tangential ribs, the bottom of said recess being inclined upward to the marginal series of teeth, as herein shown and described.

3. A grinding disk having a marginal series of shallow channels forming teeth each having a cutting edge at one side, a circular rib surrounding a central feed opening in the disk, ribs extending tangentially from the circular rib to the marginal series of teeth and each rib having a cutting edge at one side, pockets between the ribs and teeth and inclined upward to the teeth, and a recess cutting across the circular rib; combined with a disk 20 having shallow channels tangentially disposed and extending inward from the periphery of the disk, and a recess in said disk at the central portion thereof.

4. A grinding disk having a marginal series of shallow channels forming teeth each having a cutting edge at one side, a circular rib surrounding a central feed opening in the disk, ribs extending tangentially from the circular rib to the marginal series of teeth and each having a cutting edge at one side, pockets between the ribs and teeth and inclined upward to the teeth, and a recess cutting across the circular rib and extending alongside the cutting edge of one of the tangential ribs combined with a companion grinding disk having shallow channels tangentially disposed and extending inward from the periphery of the disk, and a recess extending parallel with a diameter of the disk and presenting a cutting edge at one side.

In testimony whereof we have signed our names to this specification in the presence of two subscribing witnesses.

FRANK BARTZ.
FREDERICK A. WYGANT.

Witnesses:
F. G. HOLLANDS,
D. M. HURLBURT.